Patented May 20, 1930

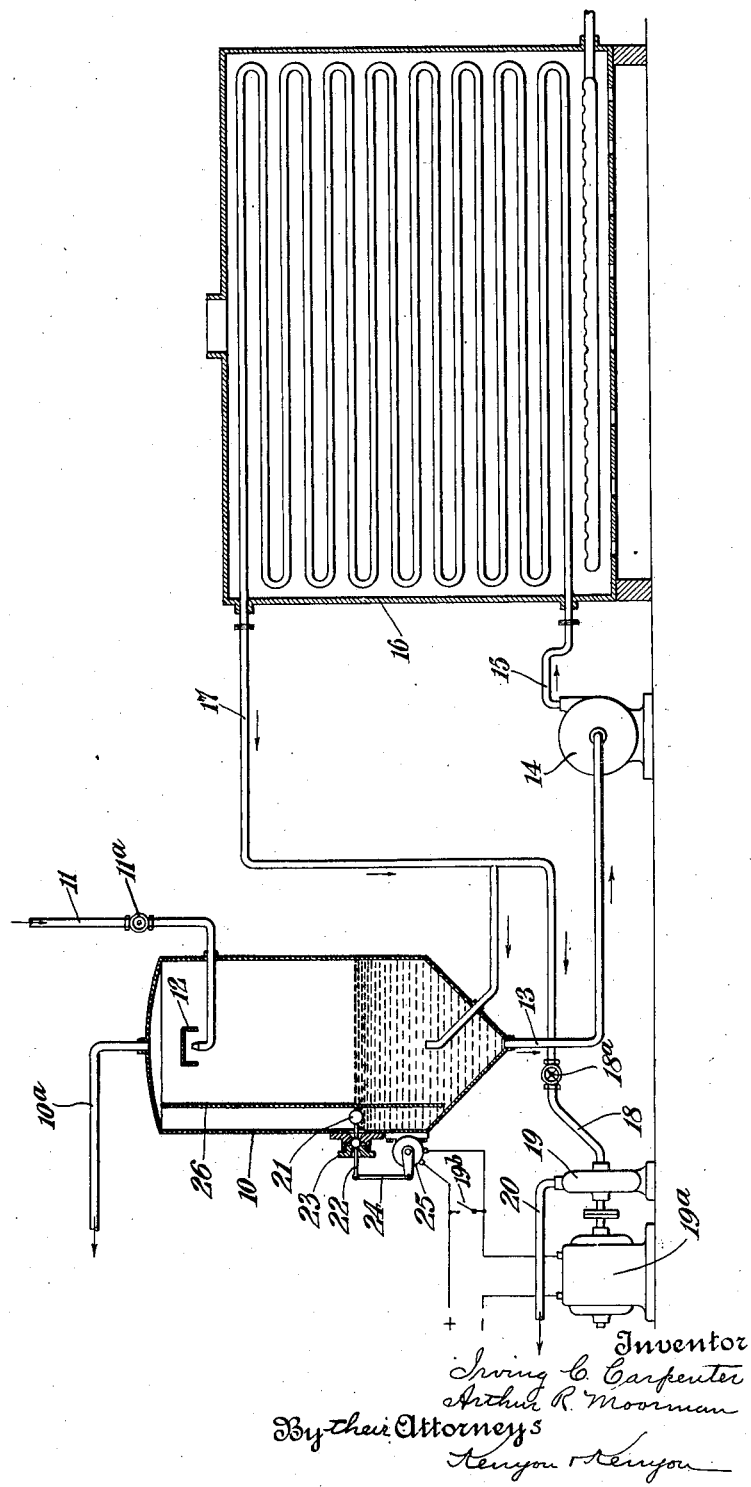

1,759,343

UNITED STATES PATENT OFFICE

IRVING C. CARPENTER, OF NEW YORK, N. Y., AND ARTHUR R. MOORMAN, OF TULSA, OKLAHOMA, ASSIGNORS, BY MESNE ASSIGNMENTS, TO CONTACT FILTRATION COMPANY, OF SAN FRANCISCO, CALIFORNIA, A CORPORATION OF DELAWARE

DECOLORIZATION OF HYDROCARBONS

Application filed September 17, 1926. Serial No. 136,029.

This invention relates to the decolorization of petroleum oil.

One method of decolorizing petroleum oil is to add thereto a finely ground clay which absorbs the coloring material from the oil. The clay used usually contains water or moisture either naturally or because of treatment prior to its addition to the oil to increase its efficiency. The clay is more effective as a decolorizing agent at elevated temperature and for this reason the mixture of oil and clay is heated during the decolorizing operation. One way of heating the oil and clay is to pass the mixture through a tube or pipe heater. In the passage of the mixture through the heater any water in the clay is evaporated and as the water generally contains scale-forming material which upon the evaporation of the water in contact with the tubes of the heater is deposited thereon as scale, the tubes become clogged after the period of operation. Moreover the evaporation of water in the heater also produces a variable increase in velocity of the mixture which becomes sufficiently high to cause serious abrasion.

It is an object of this invention before the mixture of oil and clay is passed through the heater to remove therefrom any water that may be contained therein, thereby preventing the formation of scale in the heater tubes and variation in the velocity of flow of the mixture through the heater, thus partially preventing abrasion.

According to this invention a body of oil in a tank is heated to a temperature above the vaporization point of water by passing oil through a circulating system including the tank, a pump and a heater. Mixed oil and clay are fed to the body of oil, any water in the clay evaporating upon contact with the heated oil and escaping through a vent in the tank. Any scale-forming material which the water may have contained is deposited in the body of oil in solid form and is mixed with the clay with which it is freely carried through the heater. Means are provided for withdrawing from the circulating system enough oil and clay discharged from the heater to maintain substantially constant the volume of the fluid in the tank. The mixture of oil and clay is heated to a temperature at which the effectiveness of the clay is increased but is not heated sufficiently to vaporize any substantial amount of oil. The design of the circulating system is such that the mixture returned to the tank maintains the temperature of the fluid therein sufficiently high that moisture in the mixture of clay and oil added to the tank is vaporized on contact with the surface of the fluid. The mixture withdrawn from the circulating system is collected and treated in any suitable manner to separate the oil and clay.

With this method of decolorizing the oil no water passes into the heater as evaporation of the water takes place within the tank in contact with the fluid therein and the scale-forming material mixes with the clay with which it travels freely through the heater. The velocity of the mixture in the heater remains substantially uniform as no vaporization takes place therein so that abrasion is materially reduced.

Other objects, novel features and advantages of this invention will be apparent from the following specification and accompanying drawings wherein is disclosed diagrammatically one type of apparatus for decolorizing oil in accordance with the invention.

In the apparatus disclosed 10 is a tank having a vent pipe $10^a$. An inlet pipe 11 controlled by the valve $11^a$ leads into the upper part of the tank and has its inner end upturned toward a baffle plate 12. From the bottom of the tank 10 a pipe 13 leads to a pump 14 from which a pipe 15 leads to a heater 16 preferably of the tube type. A pipe 17 leads from the discharge end of the heater 16 to the tank 10 and is here shown as entering the tank near the bottom and projecting into the tank a short distance although it might be connected to the tank at any other place if found desirable. A branch pipe 18 controlled by the valve $18^a$ leads from the pipe 17 to a pump 19 driven by a motor $19^a$. The outlet 20 of the pump leads to a storage tank, not shown.

To utilize this apparatus in the decolorizing of oil with clay, a supply of previously decolorized oil is introduced into the tank 10 preferably through the pipe 11. The oil is then circulated by means of the pump 14 through the heater 16 and back into the tank 11 until it has attained the proper temperature, either the valve 18ᵃ being closed at this time or the pump 19 being idle. The temperature of the oil preferably should be high enough that water coming in contact with the surface thereof will be vaporized immediately thereby preventing foaming. In being brought up to this temperature the oil is heated in the heater 16 to a temperature considerably above the temperature desired in the tank, but preferably it is heated to a temperature approximating the vaporizing temperature of the oil so that there is substantially no vaporization of the oil. The temperature to which the oil is heated may be varied so as to obtain the most satisfactory operation under the conditions existing.

After the oil in the tank has attained the proper temperature and it has been found that a temperature of 375° F. is very satisfactory, oil mixed with decolorizing clay is introduced through the pipe 11 and sprayed over the surface of the liquid in the tank 10 through the medium of the baffle 12. The water content is immediately vaporized and passes out through the vent 10ᵃ as steam. Any scale-forming materials contained in the water are left in the tank in solid form and mix with the clay in such a manner that they pass through the heater readily and without the formation of any scale. The oil and clay are at the same time quickly heated to the temperature of the oil in the tank and the clay partially decolorizes the oil. The oil and clay then pass through the pipe heater 16 where more heat is applied and the decolorizing process completed after which the mixture of oil and clay is discharged from the heater into the pipe 17. At the same time that the mixture of oil and clay is admitted to the tank 10 the valve 18ᵃ is opened and the pump 19 started by closing switch 19ᵇ. The mixture of oil and clay discharged from the heater 16 divides, part of it returning to the tank 10 and the other part being drawn off through the pipe 18, pump 19 and pipe 20 to the storage tank. The valve 18ᵃ may be so set and the speed of the pump 19 so regulated that enough fluid is removed from the system through the pipe 18 to maintain substantially uniform the volume of fluid in the system. The volume and temperature of the fluid returned to the tank 10 from the heater 16 is such that sufficient heat is supplied to the fluid in the tank 10 to compensate for the heat dissipated in raising the water in the incoming mixture to boiling temperature and vaporizing it, heating the mixture to the temperature of the fluid in the tank and any heat losses. The fluid in the tank is therefore maintained at a substantially constant temperature which is such that substantially no water penetrates the liquid to any depth thereby preventing foaming. The rate of supply of fresh mixture to the tank 10 may be regulated by the valve 11ᵃ to maintain proper operating conditions in the system.

Automatic means may be provided, if desired, for controlling the amount of liquid withdrawn from the system through the pipe 18 in response to changes in level in the fluid in the tank 10. This means may comprise a float 21, supported at one end of a lever 22, pivotally mounted in a stuffing box 23 or the like attached to the tank. The outer end of the lever 22 is attached by means of a link 24 with the arm of a rheostat 25 by means of which is controlled the operation of the motor 19ᵃ for driving the pump 19. Within the tank 10 and surrounding the float 21 is provided a vertically arranged shield 26 to prevent foaming of the liquid in the tank 10 affecting the operation of the float 21.

Such an apparatus as above described will function satisfactorily for an indefinite period as no scale can form on the interior of the tubes and abrasion is largely prevented by maintaining uniform the velocity of flow of the mixture through the heater. All the water content of the mixture to be treated is removed before the mixture passes through the heater. Any scale-forming materials that were contained in the water mix with the clay in solid form and are readily carried through the heater therewith. It is evident that other methods of introducing the wet oil and clay into the tank or returning the heated oil to the tank may be made use of. Also different means of regulating the withdrawal of the heated oil from the system are within the contemplation of the invention. The means above described merely exemplify one way of accomplishing the result. It is moreover understood that various structural modifications may be made in the apparatus herein disclosed and described without in any way departing from the spirit of the invention as defined in the appended claims.

What we claim and desire to secure by Letters Patent of the United States is:

1. In a continuous process of decolorizing oil with clay containing water the steps of, initially heating a body of oil to a temperature above the boiling point of water, continuously feeding and distributing onto the surface of said body a mixture of oil with clay containing water to cause the evaporation of water from said mixture, removing the vapors and continuously maintaining the temperature of said oil body by heating a stream of oil-clay mixture withdrawn from and returned to said body.

2. In a continuous process of decolorizing oil with clay containing water the steps of, maintaining a body of oil and dehydrated clay at a temperature above the boiling point of water by heating a stream of oil and dehydrated clay withdrawn from and returned to said body, and separately feeding onto and distributing over the surface of said body a mixture of oil with clay containing water.

3. In a continuous process of decolorizing oil with clay containing water the steps of, heating a body of oil and substantially dehydrated clay to a temperature above the boiling point of water, feeding onto and distributing over the surface of said body a mixture of oil with clay containing water to cause the substantial dehydration of said mixture, withdrawing from said body a stream of said substantially dehydrated mixture, heating said stream to a temperature higher than said body, and maintaining the temperature of said body by returning a portion of said stream thereto.

4. In a continuous process of decolorizing oil with clay containing water the steps of, heating a body of oil and dehydrated clay to a temperature above the boiling point of water, feeding onto and distributing over the surface of said body a mixture of oil with clay containing water to cause dehydration of the mixture, removing the vapors, withdrawing from said body a stream of said dehydrated mixture, heating said stream to a temperature higher than that of said body, returning a portion of said stream to said body for maintaining the temperature thereof, and withdrawing a quantity of said dehydrated mixture from said stream sufficient to maintain said body at a substantially constant volume.

5. In a continuous process of decolorizing oil with clay containing water the steps of, heating a body of oil and substantially dehydrated clay to a temperature above the boiling point of water, feeding and distributing over the surface of said body a mixture of oil with clay containing water to cause the dehydration of said mixture by means of heat withdrawn from said body, withdrawing from said body a flow stream of said dehydrated mixture, heating said flow stream to a temperature favorable to the decolorization of said oil by said clay, said temperature being higher than that of said body, returning to said body a portion of said flow stream for maintaining said body at a substantially constant temperature and volume, and withdrawing the remainder of said flow stream.

6. In a continuous process of decolorizing oil with adsorbents containing water the steps of, distributing oil and adsorbent containing water to the surface of a body of oil-adsorbent mixture held at a temperature above the vaporization temperature of water, withdrawing from said body a stream of oil-adsorbent mixture, heating said stream to a temperature of effective decolorization but below the temperature of substantial vaporization of the oil, and returning to said body only a portion of the heated stream to maintain the aforesaid temperature of said body, while withdrawing from the system the remainder of the heated stream at a temperature in excess of the temperature of said body.

7. In a continuous process of decolorizing oil with adsorbents containing water the steps of, distributing oil and adsorbent containing water over the surface of a body of oil and adsorbent mixture held at a temperature above the vaporization temperature of water, withdrawing from said body a stream of oil and adsorbent mixture, heating said stream to a temperature of effective decolorization but below the temperature of substantial vaporization of the oil, and returning to said body in regulated amount only a portion of the heated stream to maintain said body in substantially constant volume and to maintain the aforesaid temperature of said body, while withdrawing from the system the remainder of the heated stream at a temperature in excess of the temperature of said body.

8. In a continuous process of decolorizing oil with adsorbents containing water the steps of, heating a body of oil to a temperature in excess of the boiling point of water, continuously distributing oil and adsorbent containing water over the surface of said body to cause substantial dehydration thereof, continuously withdrawing a stream of oil and adsorbent mixture from said body, continuously heating said stream to a temperature of effective decolorization but below that of substantial vaporization of the oil, continuously and separately returning but a portion of the heated stream to said body to maintain the temperature thereof, continuously regulating the amount so returned to maintain said body in substantially constant volume, and continuously withdrawing the remainder.

9. In a continuous process of dehydrating a mixture of oil and clay the steps of, heating a body of oil and clay to a temperature in excess of the vaporization temperature of water, distributing oil and clay to be dehydrated over the surface of said body of oil and clay, withdrawing a portion of said body of oil and clay, heating said portion to above the temperature at which the body of oil and clay is to be maintained, returning a portion of the heated oil and clay to the body of oil and clay to maintain the temperature thereof, and withdrawing the remainder of said oil and clay.

10. In a continuous process of substantially dehydrating a mixture of oil and adsorbent the steps of, heating a body of oil and adsorbent to a temperature in excess of the vaporization temperature of water, distributing oil and adsorbent to be dehydrated over the surface of said heated body of oil and adsorbent, removing the vapors, withdrawing a portion of said body of oil and adsorbent, heating said portion to above the temperature at which the body of oil and adsorbent is to be maintained, separately returning a part of the heated portion of oil and adsorbent to the body of oil and adsorbent to maintain the temperature and volume thereof substantially constant, and withdrawing the remainder of said heated oil and adsorbent portion.

11. A system of the character described comprising, a vessel for containing a body of oil and provided with means for the escape of vapor, means for withdrawing a flow stream of oil from said body in said vessel, means for heating said flow stream and for returning a portion thereof to said body in said vessel, means for diverting a portion of said flow stream out of the system, at a point between said vessel and the outlet end of said heating means, and means for so regulating the quantity so diverted as to maintain a substantially constant quantity of oil in said vessel, means for feeding onto the surface of the body of oil in said vessel a supply of oil containing water, said returning means consisting of a pipe connection for feeding the heated oil directly to the body of oil upon which the water containing oil is fed In testimony whereof, we have signed our names to this specification.

IRVING C. CARPENTER.
ARTHUR R. MOORMAN.